United States Patent [19]
Bhardwaj et al.

[11] 4,045,203
[45] Aug. 30, 1977

[54] COMPOSITE SEAL FOR A GLASS FORMING CHAMBER

[75] Inventors: Mahesh C. Bhardwaj, Sarver; William J. Englert, New Kensington, both of Pa.

[73] Assignee: PPG Industries, Inc., Pittsburgh, Pa.

[21] Appl. No.: 670,598

[22] Filed: Mar. 26, 1976

[51] Int. Cl.² ............................................. C03B 18/02
[52] U.S. Cl. ................................. 65/182 R; 65/374 R
[58] Field of Search ............... 65/32, 182 R, 374 M, 65/374 RM, 374 R

[56] References Cited

U.S. PATENT DOCUMENTS

| 710,357 | 9/1902 | Heal | 59/95 |
|---|---|---|---|
| 789,911 | 5/1905 | Hitchcock | 65/182 |
| 1,564,240 | 12/1925 | Hitchcock | 65/101 |
| 3,083,551 | 4/1963 | Pilkington | 65/32 |
| 3,220,816 | 11/1965 | Pilkington | 156/665 |
| 3,311,362 | 3/1967 | Rapson et al. | 65/32 UX |
| 3,337,322 | 8/1967 | Taylor | 65/32 |
| 3,584,475 | 6/1971 | Galey et al. | 65/24 |
| 3,584,477 | 6/1971 | Hainsfurther | 65/182 R |
| 3,594,147 | 7/1971 | Galey et al. | 65/182 R |
| 3,652,251 | 3/1972 | Brichard | 65/374 R X |
| 3,843,344 | 10/1974 | Galey | 65/65 A |
| 3,843,345 | 10/1974 | Harrell et al. | 65/65 A |
| 3,843,346 | 10/1974 | Edge et al. | 65/65 A |
| 3,854,922 | 12/1974 | Sensi et al. | 106/288 B |
| 3,884,665 | 5/1975 | Edge et al. | 65/99 A |
| 3,898,069 | 8/1975 | Cerutti et al. | 55/182 R |
| 3,928,012 | 12/1975 | Harrell et al. | 65/65 A |

FOREIGN PATENT DOCUMENTS 878,044   8/1971   Canada

*Primary Examiner*—Arthur D. Kellogg
*Attorney, Agent, or Firm*—E. Kears Pollock

[57] ABSTRACT

A composite seal comprising a resilient, compressible refractory material, preferably fibrous, sandwiched between two sheets of graphite or like material is placed between metal casing plates or coolers and refractory pieces, blocks or members disposed inside a glass forming chamber which contains a molten glass supporting metal that is in contact with at least some of such refractory pieces, blocks or members. The leakage, diffusion or transpiration or gases into the chamber is substantially reduced or eliminated.

10 Claims, 3 Drawing Figures

COMPOSITE SEAL FOR A GLASS FORMING CHAMBER

BACKGROUND OF THE INVENTION

1. Field of the Invention

This invention relates to apparatus for manufacturing flat glass wherein the glass is formed while being supported on a surface of a pool of molten metal contained in a refractory lined, enclosed forming chamber. More particularly, this invention relates to a combination of structural elements for improving the quality of enclosure from the external environment provided by such an apparatus.

2. Brief Description of the Prior Art

It is known that molten glass can be delivered onto a pool of molten metal, particularly tin or a tin alloy, and thereafter cooled and attenuated to form a continuous, dimensionally stable sheet or ribbon of glass. Specific glass forming techniques and apparatus are shown and described in the following patents: U.S. Pat. No. 710,357 to Heal; U.S. Pat. No. 789,911 to Hitchcock; U.S. Pat. Nos. 3,083,551 and 3,220,816 to Pilkington; and U.S. Pat. No. 3,843,346 to Edge and Kunkle. In all of these, but Pilkington's, a stream of glass is delivered onto molten metal along a substantially horizontal path that is without free-fall pouring. Whether the path is perfectly horizontal or down a slope, the streamlines of glass flow are maintained during delivery in these methods such as exemplified by that of Edge and Kunkle. In practicing the method of Edge and Kunkle, the molten glass is preferably delivered over a refractory threshold having an uppermost surface that is at or above the level of molten metal in the associated forming chamber so that the threshold acts not only as a glass support but as a dividing wall between a furnace refiner or conditioner and its associated forming chamber. Such a threshold effectively serves as a topmost portion of a furnace front basin wall and, at the same time, as an inlet or entrance end wall of the forming chamber.

In general, a forming chamber includes an outer impervious casing, usually of steel, and an inside refractory liner. Hitchcock in U.S. Pat. No. 1,564,240 shows that the molten metal of a forming chamber may be contained in a metal casing. Exemplary patents showing refractory-lined metal casing structures are U.S. Pat. Nos. 3,584,475 and 3,594,147 to Galey and Sensi and U.S. Pat. No. 3,584,477 to Hainsfurther.

Various threshold assemblies and facilities are shown and described in the following patents: U.S. Pat. No. 3,843,344 to Galey; U.S. Pat. No. 3,854,922 to Sensi and Wehner; U.S. Pat. No. 3,898,069 to Cerutti and Gulotta; U.S. Pat. No. 3,884,665 to Edge and Kunkle and U.S. Pat. Nos. 3,843,345 and 3,928,012 to Harrell and Foster. U.S. Pat. No. 3,898,069 to Cerutti and Gulotta describes and claims a positive containment threshold that includes a vertical casing member (or cooler) along with a casing bottom extension and casing side extensions to include a part of the refractory threshold inside a bottom portion (or extension) of a forming chamber casing. It has been found that this and other forming chamber casing-liner-threshold combinations may be modified to improve their ability to isolate the interior of such forming chambers from the outside environment.

In both the forming chambers, such as described by Edge and Kunkle and those such as described by Pilkington, there is a need to isolate the interior of the chambers from the outside environment. Otherwise, the supporting molten metal might oxidize or bubbles might be introduced into the glass. See Canadian Pat. No. 878,044 to Michalik which describes the need for a protective reducing gas mixture in a glass forming chamber and U.S. Pat. No. 3,337,322 to Taylor which describes a particular forming chamber gas mixture.

The present invention contemplates an improved means for the prevention of gas entry into forming chambers and may be appreciated from the following description.

SUMMARY OF THE INVENTION

A glass forming chamber comprising an impervious metal casing and a refractory liner, including a bottom container portion containing a pool of molten metal, is provided throughout or at selected locations, generally below the upper surface of the molten metal, with a composite seal disposed between the refractory liner and the casing or between adjacent pieces of the refractory liner.

The composite seal has a generally sheet-like form and comprises a pair of substantially impervious sheets with a compressible refractory material between them. The composite is preferably flexible, at least in the dimension transverse to its plane when flattened. The outer sheets of the composite are preferably substantially thinner than the inside compressible layer and the preferred outer sheet material is graphite. Flexible graphite sheeting or foil is commercially available in thickness conveniently employed in this invention. The inner refractory layer is preferably a fibrous refractory such as a refractory wool, continuous strand mat, chopped mat, woven or knit cloth, a refractory paper or the like. A particularly preferred refractory layer is one comprising a commercially available alumina-silica fiber paper (such as that sold as FIBERFRAX paper by Carborundum Co., Niagara Falls, N.Y.).

Other outer layer materials which may be effectively used include the following: heat resistant silicone rubber; heat resistant silicone resin; or pressed asbestos.

Useful alternate inside refractory layer materials include the following: pure alumina fiber; calcia or yittria stabilized zirconia fiber; boron nitride fiber; or silicon nitride fiber.

The present invention is particularly valuable when applied to a glass furnace and forming chamber combination such as described by Edge and Kunkle. The invention is viewed as the full combination including the specific composite seal which is disclosed here for the elements act in concert to provide a forming chamber having an improved capability for making high-quality flat glass that is virtually free of surface defects, such as fine seeds (bubbles) or bloom (metal oxide adhered to the glass).

In the preferred combination, a forming chamber casing extends into close proximity with the front basin wall of a glassmaking furnace, and a substantially vertical end casing plate is connected to the bottom and side plates of the extended casing. A refractory threshold comprising one or a plurality of refractory pieces is disposed over the substantially vertical end plate to provide a glass support surface for delivering molten glass from the furnace to the forming chamber. Adjacent to or part of the substantially vertical plate is a cooler in a preferred embodiment of the invention. A layer of the previously described composite seal is disposed between the casing and the refractory threshold.

When a cooler is provided at the end plate or adjacent to it, the composite seal extends along the inside surface of the casing, along the plate or cooler surfaces and into close proximity to the face of the threshold which faces molten glass in a pool of glass contained in the glassmaking furnace at its discharge end near the front basin wall of the furnace. The threshold assembly is compressed downwardly against the composite seal in the manner described and claimed by Sensi and Wehner in U.S. Pat. No. 3,854,922. Thus, the composite seal is compressed until it assumes the shape of its surroundings — the refractory and the casing (including a cooler if any). Any lack of perfect flatness of the refractory or metal components is accommodated by the resilient, compressible composite seal. This results in a gas-tight seal that is apparently free of diffusion or transpiration leakage as encountered through refractories or through imperfect casing welds.

This invention may be further understood with reference to the appended drawings in which a preferred embodiment is illustrated.

DESCRIPTION OF THE PREFERRED EMBODIMENTS

Figure 1:
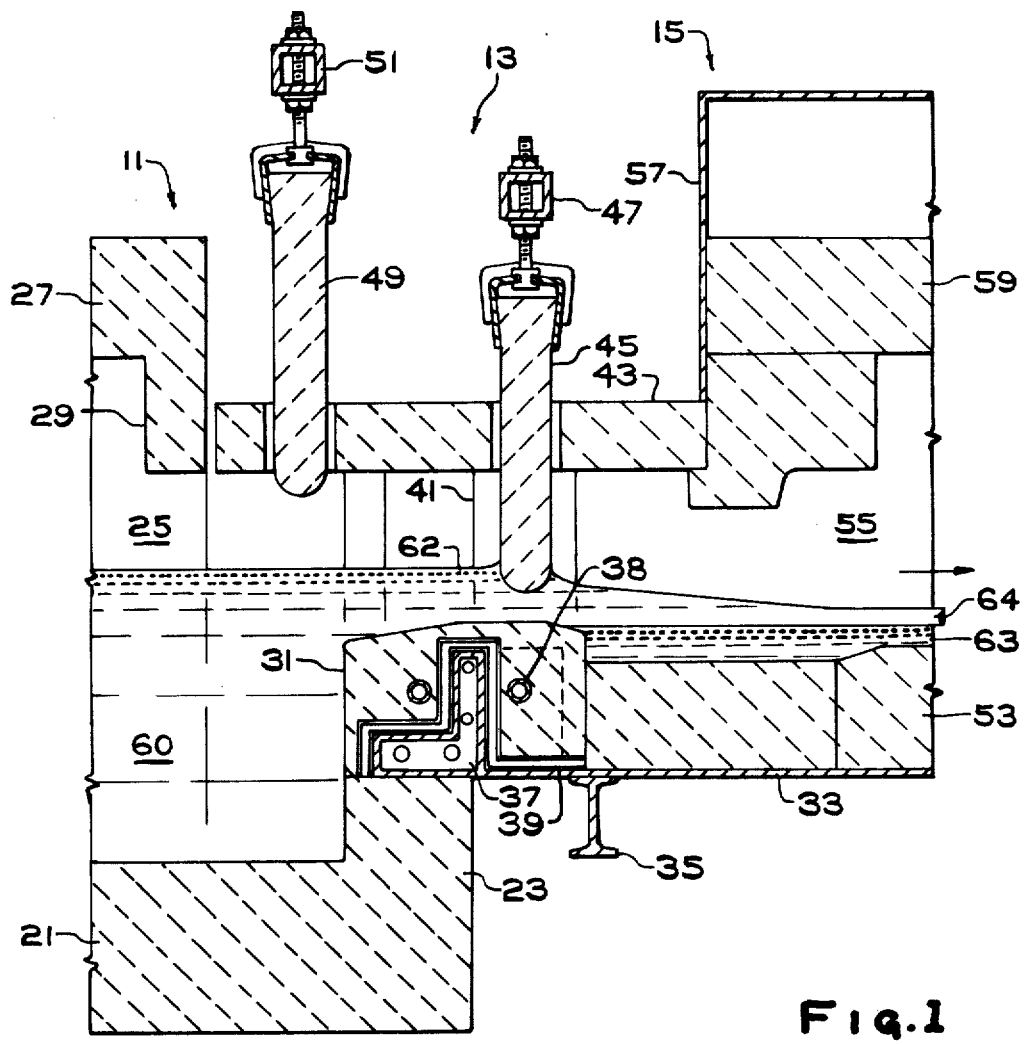
FIG. 1 is a simplified, partial longitudinal sectional elevation of a molten glass delivery facility connecting a glassmaking furnace to a glass forming chamber which employs a composite seal in combination with a casing, and liner, as prescribed for this invention.
Figure 2:
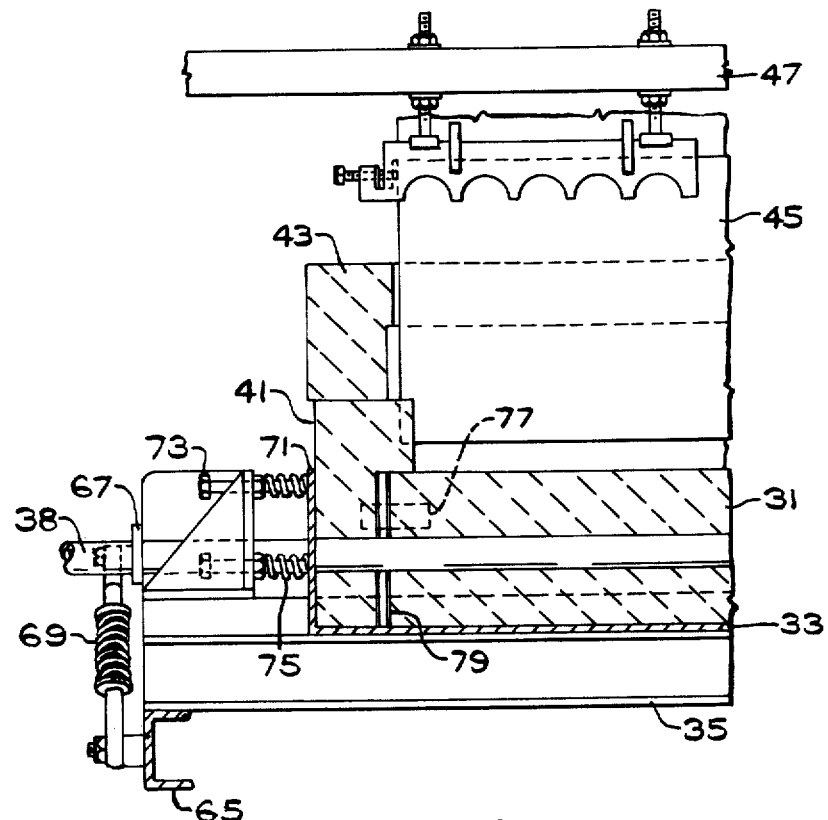
FIG. 2 is a partial, transverse sectional elevation of the apparatus shown in FIG. 1.

Referring now to FIGS. 1 and 2, there is shown a glassmaking and forming apparatus comprising a glassmaking furnace or tank (refiner or conditioner exit or discharge end shown) 11 connected through a molten glass delivery facility 13 to a glass forming chamber (inlet end shown) 15. The glassmaking furnace 11 includes a bottom 21, a front basin wall 23, side walls 25, a roof or crown 27 and an upper front wall 29.

The delivery facility 13 includes a threshold 31 resting on a casing or casing extension 33, which, in turn, rests on a structural support 35. A transverse cooler 37 is connected to the casing 33 and provides, in effect, a casing end wall. Pipe coolers 38 or other transverse members, such as rods, extend through openings in the threshold 31 across the inlet end of the forming chamber. These coolers 38 serve to hold the threshold assembly in place.

Figure 3:
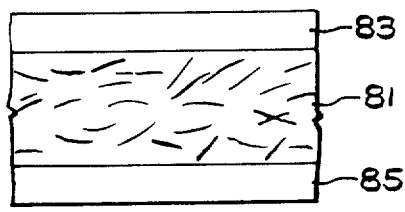
FIG. 3 is an enlarged detail section of the preferred composite seal itself.

A composite seal 39, in accordance with this invention, is disposed between the casing 33 or cooler 37 and the refractory blocks making up the threshold 31. The seal, as shown in FIG. 3, comprises three layers: an inner layer 81 of compressible, resilient refractory and two outer layers 83 and 85 of impervious heat-resistant material such as graphite.

The delivery facility 13 further includes side members or jambs 41 which extent upwardly from the ends of the threshold 31. It also includes a roof or flat arch 43 extending from the furnace 11 to the forming chamber 15. Extending downwardly through a transverse opening in the flat arch 43 directly over the threshold 31 is a metering member or tweel 45 which is supported by an assembly 47 from raising or lowering the tweel 45 to control the rate of molten glass flow over the threshold 31.

A second backup metering member or tweel 49 is provided upstream of the control tweel 45. It depends from an assembly 51 for raising or lowering it, although it is generally maintained in a raised position above the molten glass during operation.

The forming chamber 15 includes, in addition to the already mentioned lower or bottom casing 33, a refractory bottom liner 53 and side wall liners 55. An upper casing 57 extends over the chamber 15 and downwardly about its ends and sides joining the sides of the lower casing through seals or sealed joints. Inside the upper casing 57 is a refractory roof or ceiling 59 which extends across the width and length of the chamber dividing it into a service space above the roof and a headspace below it.

During operation, a pool of molten glass 60 is established in the furnace 11 and by the adjustment and maintenance of proper thermal conditions, as described in U.S. Pat. No. 3,843,346, a strong convective flow of glass is established in the refiner or conditioner of the furnace. Near the upper surface of the pool of molten glass 60 the glass is caused to flow smoothly toward the delivery facility. A surface layer of this flowing glass is skimmed from the pool and discharged over the threshold 31 and delivered onto the pool of molten metal 63 in the forming chamber 15. The glass is generally supported all along its path of flow, although the path of flow may descend along the upper surface of the threshold as the uppermost portion thereof is slightly above the surface of the pool of molten metal 63.

Following delivery onto the pool of molten metal 63, the glass is advanced along the pool through the forming chamber as a layer of glass (preferably of maintained width) as it is cooled to a dimensionally stable, continuous sheet or ribbon of glass. After the glass has been formed, it is lifted from the pool of molten metal 63 and conveyed from the forming chamber 15 for further processing such as annealing.

Referring now more specifically to FIG. 2, further aspects and details of this invention may be appreciated. As described in U.S. Pat. No. 3,854,922, the threshold 31 is urged against the forming chamber 15 by providing at each side of the delivery facility a structural member 65 to act as a restraint or dead man and a bearing plate 67 which are joined by a tension arm 69 which draws the threshold assembly toward the forming chamber 15.

The assembly includes a side casing plate 71 on each side which extends from the bottom casing 33 around the outside of the delivery facility. A backup bucking assembly 73 is mounted on each end of a transverse structural member extending beneath the delivery facility from side to side. compression members 75, such as bolts or springs, are provided to press inwardly against the side casing plates and threshold assembly including the jambs 41. The jambs 41 may be internally joined to the threshold by refractory dowels or pins 77.

In a preferred embodiment a layer of the composite seal 79 described above is positioned between each jamb 41 and the threshold 31. By compressing the assembly, this composite seal layer is compressed to be thinner than it is at the time of construction. This causes a gas tight seal to be established between the jambs and the threshold as the resilient, compressible seal deforms to accommodate any inherent roughness or misfit of or between the refractory pieces making up the jambs and threshold.

The operation of the described apparatus is such that glass, having improved surface and internal quality, can be produced. The described seals, in combination with the structure as a whole, prevent the ingress of gases from the outside environment into the chamber. Consequently, oxidation of the molten metal may be reduced and the glass which is produced will be more free of tin than would otherwise be possible.

The preferred graphite sheet material for use in this invention is that sold under the trademark GRAFOIL by Union Carbide Corporation, 120 S. Riverside Plaza, Chicago, Ill. It has a thermal conductivity of only 2-3 BTU-ft/hrft$^2$° F. through its thickness, a helium admittance through a sheet 0.005 inch thick of only $2 \times 10^{-4}$ cm$^2$/sec and a permeability through its thickness of $4 - 9 \times 10^{-6}$ darcys. During use the composite seal described will reach temperatures on the order of 1500° to 2000° F. and the outside sheet of graphite may be attacked by oxgyen despite the presence of the casing. The oxidation which can occur will be at a rate of about two percent loss of weight per hour in air at a temperature of about 1000° F. The graphite sheets employed may conveniently have thicknesses from on the order of 0.005 inch to about 0.15 inch although other thickness material may also be used.

Particularly useful composite seals may be made employing outer sheets of impervious material having densities in the range of from 50 to 100 pounds/cubic foot (800 to 1280 kilograms/cubic meter and in thickness of from 0.005 inch to 0.020 inch (0.13 millimeter to 0.52 millimeter) and an inner layer of resilient refractory having an uncompressed density in the range of from 3 to 12 pounds/cubic foot (48 to 192 kilograms/cubic meter) and in thicknesses (uncompressed) of from 0.03 inch to one inch (0.76 millimeter to 25.4 millimeters).

Although this invention has been described with reference to certain specific embodiments of it, those skilled in the art will recognize variants which do not depart from the spirit of the invention nor from the scope of the following claims.

We claim:

1. In an apparatus for making flat glass comprising a glass furnace connected to a forming chamber through a molten glass delivery facility wherein the forming chamber includes an impervious metal casing having an inner refractory liner containing a pool of molten metal for supporting glass during forming and the delivery facility includes a refractory support mounted at least partially inside the casing for supporting molten glass during its delivery to the forming chamber, the improvement which comprises:

a substantially impervious, flexible and compressible composite layered seal disposed between the refractory support and the casing, said composite layered seal comprising a pair of outer layers and an inner layer therebetween each of said layers having a surface in coextensive contact with that of an adjacent layer, said outer layers being composed of a flexible and substantially impervious dense refractory material and said inner layer being composed of a compressible less dense resilient refractory material.

2. The apparatus according to claim 1 wherein the compressible, resilient refractory comprises fibers of silica, alumina or silica-alumina mixtures.

3. The apparatus according to claim 2 wherein te compressible, resilient refractory is a silica-alumina paper.

4. The apparatus according to claim 3 wherein each of the two substantially impervious sheets is a graphite sheet.

5. The apparatus according to claim 1 wherein the molten glass delivery facility further includes refractory side members extending upwardly at the ends of the refractory support, which side members have portions facing the ends of the refractory support and wherein a substantially impervious, flexible and compressible composite layered seal is disposed between each end of the refractory support and the facing portion of its respective side member, said composite layered seal comprising a pair of outer layers, and an inner layer therebetween each of said layers having a surface in coextensive contact with that of an adjacent layer, said outer layers being composed of a flexible and substantially impervious dense refractory material and said inner layer being composed of a compressible less dense resilient refractory material.

6. The apparatus according to claim 5 wherein compression members are mounted adjacent the outside of the delivery facility and urged against the side members for at least partially compressing the composite seals between the side members and the ends of the refractory support.

7. The apparatus according to claim 5 wherein the compressible, resilient refractory of the composite seals at the ends of the refractory support comprises fibers of silica, alumina or silica-alumina mixtures.

8. The apparatus according to claim 7 wherein the compressible, resilient refractory of the composite seals at the ends of the refractory support is a silica-alumina paper.

9. The apparatus according to claim 8 wherein each of the two substantially impervious sheets is a graphite sheet.

10. The apparatus according to claim 1 wherein the compressible, resilient refractory is a fibrous composition having an uncompressed bulk density of from 3 pounds/cubic foot to 12 pounds/cubic foot (48 to 192 kilograms/cubic meter) and an uncompressed thickness in the composite seal of from 0.03 inch to 1.0 inch (0.76 millimeter to 25.4 millimeters) and each substantially impervious sheet is a graphite sheet having an uncompressed bulk density of from 50 pounds/cubic foot to 80 pounds/cubic foot (80 to 128 kilograms/cubic meter) and an uncompressed thickness in the composite seal of from 0.005 inch to 0.020 (0.13 millimeter to 0.52 millimeter).

* * * * *